United States Patent [19]

Jack et al.

[11] Patent Number: 5,379,077
[45] Date of Patent: Jan. 3, 1995

[54] SYSTEM FOR AND METHOD OF, OPERATING UPON NTSC AND PAL SIGNALS

[75] Inventors: Keith A. Jack, San Diego; Douglas D. Moran, Carlsbad; David J. Wicker, Poway, all of Calif.

[73] Assignee: Brooktree Corporation, San Diego, Calif.

[21] Appl. No.: 164,263

[22] Filed: Dec. 9, 1993

Related U.S. Application Data

[63] Continuation of Ser. No. 806,711, Dec. 12, 1991.

[51] Int. Cl.$^6$ ............................................. H04N 9/64
[52] U.S. Cl. ................................. 348/708; 348/645; 348/640; 348/641
[58] Field of Search ............... 348/708, 649, 651, 654, 348/645, 655, 646, 647, 656, 710, 630, 640, 641, 663, 713, 624, 472, 505; H04N 9/65, 9/66, 9/64

[56] References Cited

U.S. PATENT DOCUMENTS

| | | | |
|---|---|---|---|
| 4,251,831 | 2/1981 | Kamath | 358/21 R |
| 4,349,833 | 9/1982 | Clarke | 358/23 |
| 4,633,298 | 12/1986 | Steckler | 358/19 |
| 4,675,724 | 6/1987 | Wagner | 358/19 |
| 4,694,326 | 9/1987 | Demmer | 358/23 |
| 4,812,903 | 3/1989 | Wagensonner | 358/40 |
| 4,982,179 | 1/1991 | Ogawa | 358/23 |

Primary Examiner—James J. Groody
Assistant Examiner—Sherrie Hsia
Attorney, Agent, or Firm—Ellsworth R. Roston; Schwartz: Charles H.

[57] ABSTRACT

A system converts PAL and NTSC pixel clock signals to signals (in a studio, digital or square pixel format) at a sub-carrier frequency individual to the PAL and NTSC formats. The system includes a first register for providing a particular increase in the register count upon each occurrence of a pixel clock signal. Any remainder in the first register upon the production of the output signal is introduced to the register upon the occurrence of the next pixel clock signal. The particular increase in the first register count is controlled by a value in a second register, this value being adjustable dependent upon the system format and mode. A sequence of registers may be substituted for the first register with each register receiving an output from the previous register in the sequence. The system also converts signals representing the primary colors to luminance and chrominance signals. The luminance and chrominance signals are processed to produce a control signal having characteristics dependent upon the cumulative intensity of the luminance and chrominance. The control signal is used to vary the amplitude of the chrominance signals so that the chrominance intensity does not increase above or decrease below a problematic level at any instant.

32 Claims, 2 Drawing Sheets

SYSTEM FOR AND METHOD OF, OPERATING UPON NTSC AND PAL SIGNALS

This is a continuation of application Ser. No. 07/806,711 filed Dec. 12, 1991.

This invention relates to a system for generating color television signals in either of NTSC or PAL formats operative in different parts of the world and in any of the different modes (studio, digital and square pixel) and for producing sub-carrier signals individual to such different formats. The invention also relates to a system for scaling the signals representing chrominance so that the intensity of the luminance and chrominance signals do not exceed legal or problematic levels.

BACKGROUND OF INVENTION

Different parts of the world provide television images on a video screen and the accompanying sound by using systems which are not compatible with one another. The United States was the first to adopt specifications for a television system. The system adopted is designated as "NTSC". Its specifications are not as rigorous in providing a clear image as the specifications adopted for the television systems in other parts of the world. In most of Europe, the system adopted is designated as "PAL". Since it was adopted after the adoption of the NTSC system, its specifications are more rigorous than the NTSC system and it provides a clearer image than the NTSC system.

In each of the NTSC and PAL television systems, a pixel clock frequency is provided for transmitting the television signals. The pixel clock signals for each of the NTSC and PAL television systems are different from the pixel clock signals for the other television systems. Furthermore, each of the different television systems has a number of different pixel clock frequencies depending upon the mode or use of the television system. For example, each of the NTSC and PAL television systems requires pixel clock signals at an individual frequency depending upon the mode or use of the system in applications involving square pixels or in digital video or studio applications.

In addition to requiring a pixel clock frequency, each of the NTSC and PAL systems provides a sub-carrier frequency at a particular frequency below the pixel clock frequency. The sub-carrier frequency for each of the NTSC and PAL systems is different from the sub-carrier frequencies for the other system. However, the sub-carrier frequency for each of the NTSC and PAL systems remains the same regardless of the mode provided (square pixels, studio or digital). The signals at the sub-carrier frequency provide the color burst at the beginning of a line and carry the chrominance information.

It would be desirable to provide a system which generates signals in each of the NTSC and PAL formats and in any of the different modes (square pixel, studio and digital) and which provides sub-carrier signals at the proper frequency regardless of the format and mode used. However, in spite of the existence of such desirability for some time and the realization by the television and data processing industries of the existence of such desirability, no one has been able to provide a system which is able to fulfill this desirability by providing a system with the required universality.

Another problem has existed in the television industry for some time. When luminance and chrominance signals providing color information are produced, the amplitude of the chrominance signals sometimes rises above a level which the receiving system is not equipped to properly handle or falls to or below a level at which video timing information may not be correctly recovered. This problem has existed for some time without a satisfactory resolution even through the appreciation of the problem, and the need or desirability for its resolution, have existed for such time.

SUMMARY OF THE INVENTION

This invention provides a system which addresses and resolves the problems discussed above. The system generates signals in each of the NTSC and PAL formats and in any of the different modes (square pixel, studio and digital) and provides sub-carrier signals at the proper frequency regardless of the format and mode being used. The system also scales the intensities of the chrominance so that progressive intensities of chrominance are provided in the picture tube through the full range of amplitudes of the chrominance signals even when the amplitudes of the chrominance signals extend above or fall below the legal or problematic level of the color in the picture tube.

In one embodiment of the invention, a system converts PAL and NTSC pixel clock signals to signals at a sub-carrier frequency individual to the PAL and NTSC formats. The pixel clock signals may be in a studio, digital or square pixel mode. The system includes a first register for providing a particular increase in the count in the register upon each occurrence of a pixel clock signal. Any remainder in the first register upon the production of the output signal is introduced to the register upon the occurrence of the next pixel clock signal.

The particular increase in the count in the first register is controlled by a modulus in a second register, this modulus being adjustable dependent upon the system format and mode. A sequence of registers may be substituted for the first register with each register receiving an output from the previous register in the sequence.

The system also converts signals representing the primary colors to luminance and chrominance signals. The luminance and chrominance signals are processed to produce a control signal having characteristics dependent upon the cumulative intensity of the luminance and chrominance. The control signal is used to vary the amplitude of the chrominance signals so that the chrominance intensity does not increase above or decrease below a legal or problematic level at any instant.

DETAILED DESCRIPTION OF THE INVENTION

Figure 1:
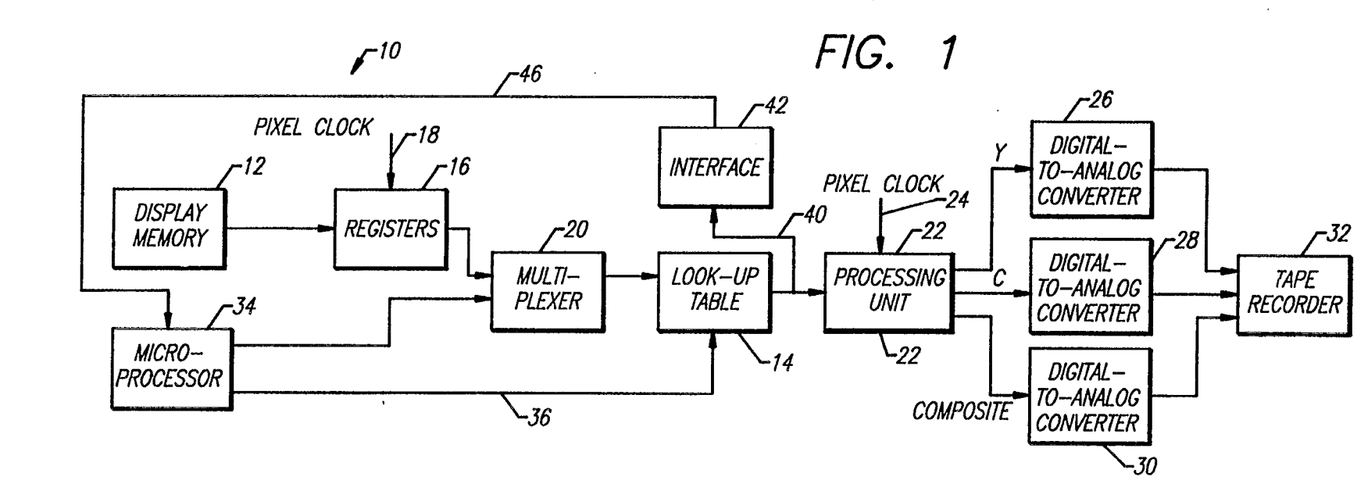
FIG. 1 is a circuit diagram in block form of a system constituting one embodiment of this invention for recording on a storage medium such as tape signals representing color information for the progressive pixels in a picture tube so that the signals on the tape can be subsequently processed to provide a color image in the picture tube.
Figure 2:
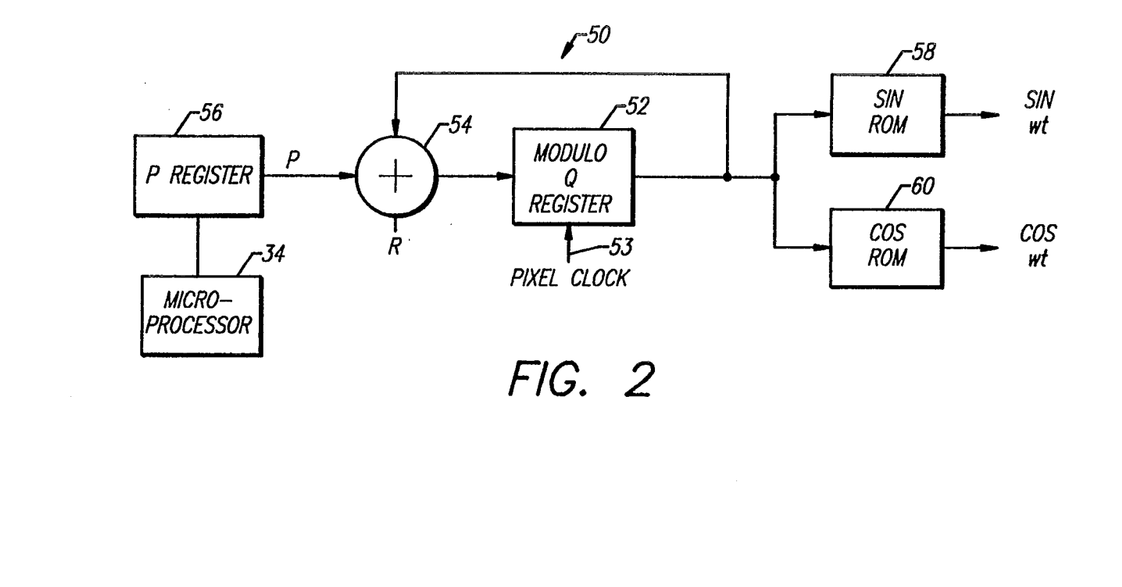
FIG. 2 is a circuit diagram in block form of an embodiment of a sub-system of the system shown in FIG. 1 for receiving signals in each of the NTSC and PAL formats and in any of the different modes (square pixel, studio and digital) and for providing sub-carrier signals at the proper frequency regardless of the format and mode used.
Figure 3:
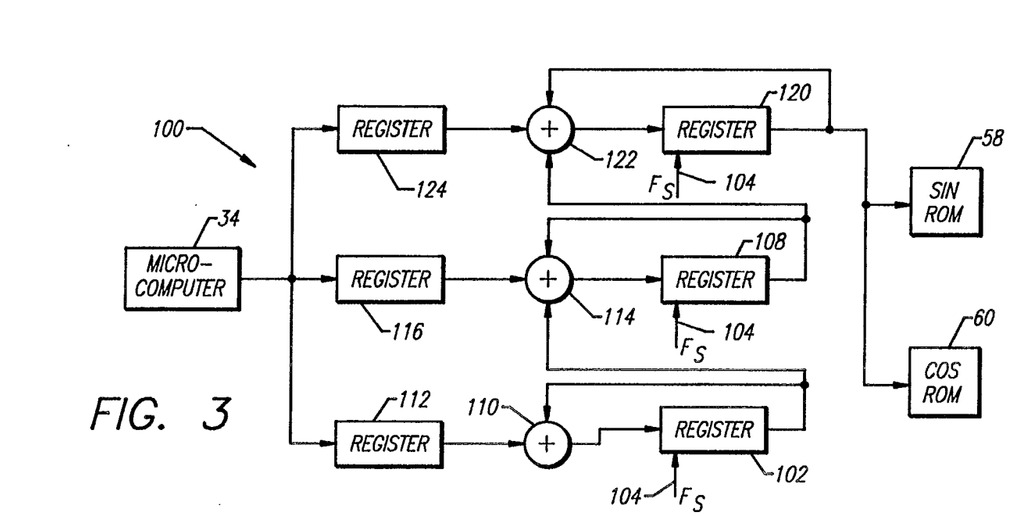
FIG. 3 is a circuit diagram in block form of an expanded embodiment of the sub-system shown in FIG. 2.
Figure 4:
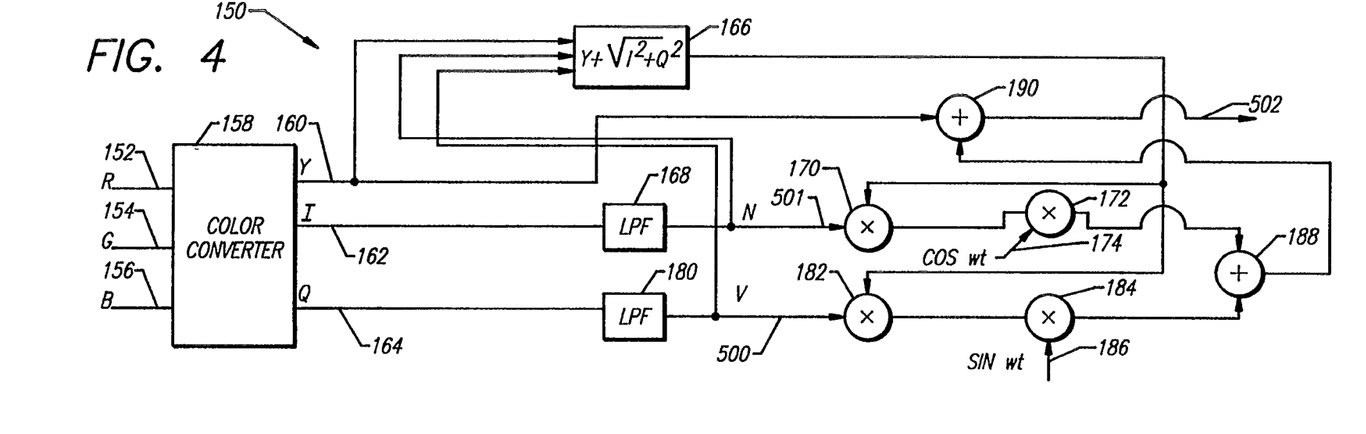
FIG. 4 is a circuit diagram in block form of an embodiment of a sub-system for scaling the intensities of the chrominance in a picture tube image to provide chrominance intensities through the full range of chrominance signal amplitudes even when the chrominance signal amplitudes occur above or below legal or problematic levels.

FIG. 1 illustrates a system, generally indicated at 10, in which the sub-systems shown in FIGS. 2, 3 and 4 can be incorporated, the sub-systems shown in FIGS. 2, 3 and 4 constituting embodiments of the invention. The system shown in FIG. 1 is well known in the art at the level of the block diagram shown in that Figure. The system shown in FIG. 1 includes a display memory 12 which stores addresses to a look-up table 14. The addresses indicate the particular position in the look-up table 14 to be activated. The look-up table 14 has a number of portions, such as two hundred and fifty six (256), each storing binary indications representing the intensity of each of the three (3) primary colors red, green and blue.

The display memory 12 stores at each of the successive positions binary information representing the particular position to be addressed in the look-up table 14 when such position in the display memory is activated. The display memory 12 is addressed at a rate corresponding to the rate at which the successive pixels are displayed on a picture tube (not shown) such as the pixel tube of a color television set. Every time that the display memory 12 is addressed, it produces binary signals from a successive position in the display memory.

The binary address signals from each of the successive positions in the display memory 12 are introduced to registers 16 which are synchronized with the pixel clock rate by signals on a line 18. The address signals are then introduced to a multiplexer 20 which operates as a switch to pass the signals to the look-up table 14. A particular position in the look-up table 14 is addressed by the signals passing through the multiplexer 20 from the registers 16. This position contains information relating to a particular color.

The color information from the look-up table 14 passes from the look-up table 14 to a processing unit 22 which is also synchronized in operation with the pixel clock signals on a line 24. The pixel clock signals on the line 24 correspond to the pixel clock signals on the line 18. The synchronized signals from the processing unit 22 pass to digital-to-analog converters 26, 28 and 30. The converters 26, 28 and 30 respectively convert the binary signals representing the characteristics of the video signals Y, C, and composite to analog signals representing such characteristics. The analog signals are recorded on a suitable storage medium such as a tape by suitable equipment such as a tape recorder 32. In this way, the information representing a color image can be stored on the tape for subsequent use.

It may be desired at times to update the information stored in the look-up table 14. For example, it may be desired to change the blue background on an image to a yellow background. This updating may be provided by a microprocessor 34 which provides signals at a frequency asynchronous with respect to the pixel clock frequency. The signals from the microprocessor 34 constitute address signals which pass through the multiplexer 20 to the particular position to be changed in the look-up table 14. When this particular position has been addressed in the look-up table 14, signals representing the change to be made at the particular position in the look-up table 14 are introduced through a bus 36 to the look-up table to update the information at the particular position in the look-up table. The signals passing through the bus 36 are at a frequency asynchronous with respect to the pixel clock frequency.

It may be desirable to confirm what is being recorded at the particular position in the look-up table 14 from the microprocessor 34. Under such circumstances, the signals recorded at the particular position in the look-up table 14 from the microprocessor pass through a line 40 to an interface 42 and from the interface 42 through a bus 46 to the microprocessor 34. The microprocessor 34 then processes these signals to confirm that the signals recorded at the particular position in the look-up table 14 accurately represent the desired information.

As will be appreciated, the pixel clock rate is an important consideration in the system shown in FIG. 1. This is particularly true when the system is intended to be used generically for an NTSC format (the format used in the United States) and a PAL format (the format used in most of Europe). The pixel clock frequency may be different for the NTSC format than for the PAL format. Furthermore, the pixel clock frequency is different for individual modes of operation in each of the NTSC and PAL formats. This may be seen from the following table specifically identifying the pixel clock frequency for each individual one of the NTSC and PAL formats and specifically identifying the different modes in each format:

| Format | Mode | Frequency in Megahertz (MHz) |
| --- | --- | --- |
| NTSC | Square Pixels | 12.27 |
|  | Digital Video | 13.5 |
|  | Studio | 14.38 |
| PAL | Square Pixels | 14.75 |
|  | Digital Video | 13.5 |
|  | Studio | 17.72 |

As will be seen, an individual pixel clock frequency is provided for each of the different modes in each of the NTSC and PAL formats. However, the same sub-carrier frequency is provided for the NTSC format regardless of the mode of operation. This frequency has been set at substantially 3.58 megahertz (MHz). In like manner, the same sub-carrier frequency, but different from that for the NTSC format, is provided for the PAL format (4.43 mHz) regardless of the mode of operation in this format. Signals at this sub-carrier frequency are provided as the color burst signals immediately after the horizontal sync pulse in each horizontal line to regulate the demodulation of the color signals in that line. Signals at the sub-carrier frequency in each line are also provided as the carrier for the chrominance signals in that line.

The sub-system generally indicated at 50 in FIG. 2 provides for the production of sub-carrier signals at the appropriate frequency regardless of the format and mode of operation of the sub-system. The sub-system 50 includes a modulus Q register 52 connected to receive the signals at the pixel clock frequency on a line 53. The input to the register 52 is from an adder 54 which receives signals from the output of the register 52 and from a register 56 adjustable in accordance with the operation of the microprocessor 34 also shown in FIG. 1. The output from the register 52 is introduced to a pair of read-only memories 58 and 60. The memory 58 is programmed to provide a sine function in accordance with the output from the register 52 and the register 60 is programmed to provide a cosine function in accordance with the output from the register 52.

The register 52 may be considered to provide a modulus of Q. The overflow signals at the sub-carrier frequency are obtained from the output of the register 52. This sub-carrier frequency is determined in accordance with the following formula:

$$F_{SC} = \frac{P}{Q} F_s, \text{ where} \tag{1}$$

$F_{SC}$ = the sub-carrier frequency at the output of the register 52;
$F_S$ = the pixel clock frequency of the signals introduced to the line 53;
P = the value of the register 56; and
Q = the modulus of the register 52.
Since all of $F_{SC}$, $F_S$ and Q are known, the value of the register 56 is adjusted to provide the desired value of P for obtaining the proper value of the sub-carrier frequency $F_{SC}$.

The operation of the sub-system shown in FIG. 2 may be seen from the following discussion. The register 52 may be considered to function as a counter which produces an overflow signal when it has counted to a full count. This full count may be considered to be the modulus Q. The overflow signals are at the sub-carrier frequency $F_{SC}$ when the register has the proper value P. The non-overflow signals are introduced to the read-only memory 58 to produce signals having a sine function at the sub-carrier frequency and to the read-only memory 60 to produce signals having a cosine function at the sub-carrier frequency.

The register 52 provides an increase in the count every time that one of the signals on the line 53 at the pixel clock frequency is introduced to the register. The increase in the count in the register 52 upon the occurrence of each signal at the pixel clock frequency is dependent upon the value of P in the register 56. For example, if P has a value of four (4), the count in the register 52 is increased by a value of four (4) every time that one of the signals at the pixel clock frequency is introduced to the register 52.

When the register 52 overflows, it may sometimes happen that there may be a remainder in the register. For example, if the register 52 has a modulus of 2048 and the value of the register 56 is 4 and there is a count of 2046 in the register, the next signal on the line 53 will cause the register 52 to overflow. However, there is a remainder of two (2) in the register 52 because the count in the register would have been 2050 if the register had not overflowed at a count of 2048. This remainder of two (2) is added into the register with the count of four (4) from the register 56 the next time that a signal at the pixel clock frequency is introduced through the line to the register 52.

FIG. 3 generally illustrates at 100 the sub-system of FIG. 2 in block form in increased detail. In the embodiment of the sub-system shown in FIG. 3, registers 102, 108 and 120 receive the signals on a line 104 at the pixel clock frequency $F_S$ when the sub-system 100 is operating in the PAL format. However, the register 102 is not used in the NTSC format.

In the PAL format, the register 102 receives an input from an adder 110 as well as the signals on the line 104 at the pixel clock frequency $F_S$. The output of the register 102 is introduced as an input to the adder 110 as is the output from a register 112. The value of the register 112 is set by the microcomputer 34.

In the PAL format, the overflows from the register 102 are introduced to an adder 114. Other inputs are introduced to the adder 114 from the register 108 and from a register 116, the value of which is set by the microcomputer 34. In like manner, the overflows of the register 108 are introduced to an adder 122. The adder 122 also receives signals from the register 120 and from a register 124, the value of which is controlled by the microcomputer 34. The non-overflow outputs of the register 120 are introduced to the read only memory 58 to provide a sine function and to the read-only memory 60 to provide a cosine function.

As previously indicated, the signals on the line 104 are introduced at the pixel clock frequency $F_S$ to the registers 108 and 120 when the sub-system 100 is operating in the NTSC format. In the NTSC format, no signals are introduced to the adder 114 from the register 102 because the register is not included in the sub-system 100 in the NTSC format. In the NTSC format, a number of counts are added to the register 108 upon each introduction of a pixel clock signal to the register through the line 104. The increase in the count in the register 108 is dependent upon the value in the register 116. The non-overflow output of the register 108 is also introduced to the adder 114 upon each overflow in the register and is added to the register the next time that a signal at the pixel clock frequency is provided on the line 104.

Each overflow in the register 108 is introduced to the adder 122. Other inputs to the adder 122 are from the register 124 and the remainder in the register 120 upon each overflow from the register 120. The overflow signals from the register 120 occur at the sub-carrier frequency in the NTSC mode. The non-overflow signals in the register 120 are converted to a sine function by the read-only memory 58 and into a cosine function by the read-only memory 60.

The operation of the registers 102, 108, 112, 116, 120 and 124 may be seen from the following equation:

$$F_{SC} = \frac{P_1 + \frac{P_2}{Q_2}}{Q_1} F_S \tag{2}$$

wherein $Q_2$ = the modulus 2048 in the register 120;
$P_1$ = the input to the adder 114 from the register 116;
$P_2$ = the input to the adder 122 from the register 124; and
$Q_1$ = the modulus in the register 108.
For NTSC, Equation (2) may be simplified to $$F_{SC} = \left(\frac{910}{4}\right) \cdot \left(\frac{1}{H_c}\right) F_S \tag{3}$$

In equation (3), $H_C$ is the number of pixels in each scan line. 4 $H_C$ is the modulus established in the register 108.

As previously described, all three of the registers 102, 108 and 120 are used in the PAL format. In the PAL format, $F_{SC}$ may be defined by the following equation:

$$F_{SC} = \left(\frac{1135}{4} + \frac{1}{625}\right)\left(\frac{1}{H_C}\right) F_S \qquad (4)$$

The register 102 is provided with a modulus of 625 in the PAL format. $H_C$ is the number of pixels in each scan line. 4 $H_C$ is the modulus established in the register 108.

FIG. 4 illustrates one embodiment of a sub-system, generally indicated at 150, for assuring that a progressive range of color intensities is provided in a color image even when the video signals have amplitudes above or below the legal or problematic level. In the sub-system 150 shown in FIG. 4, the signals representing the primary colors red, green and blue are respectively provided on lines 152, 154 and 156.

The signals on the lines 152, 154 and 156 are introduced to a color converter 158 which may be constructed in a manner well known in the art. The converter 158 produces on a line 160 signals representing at each instant the luminance of the color image at that instant. Such signals are generally designated as "Y". The converter 158 also produces on lines 162 and 164 signals having a quadrature relationship and together representing the chrominance of the color information at each instant. These signals are generally designated as "I" and "Q".

The signals representing the chrominance factor I on the line 162 are introduced to a low pass filter 168 having characteristics of passing signals through a range of frequencies to approximately one and three tenths megahertz (1.3 MHz). Filtering the signals representing the chrominance component I to a range of approximately 1.3 MHz is well known in the art. The signals from the filter 168 are then introduced to a multiplier stage 170 as are the signals from a stage 166.

In like manner, the signals representing the chrominance factor Q are introduced to a low pass filter 180 having characteristics of passing signals through a range of frequencies to approximately six tenths of a megahertz (0.6 MHz). Filtering the signals representing the chrominance component Q to a range of approximately 0.6 MHz is well known in the art. The signals from the filter 180 are then introduced to a multiplier stage 182 as are the signals from the stage 166.

Figure 5:
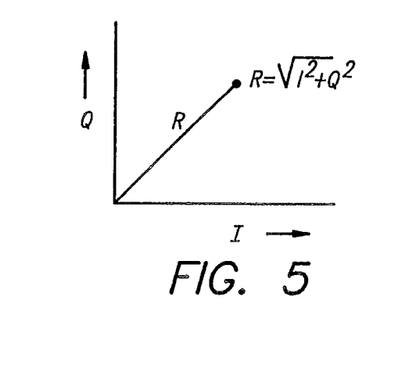
FIG. 5 is a curve schematically illustrating the operation of certain stages in the embodiment shown in FIG. 4.

The signals on the line 160 and on lines 500 and 501 are introduced to the stage 166 which produces a signal having an amplitude corresponding to $Y + \sqrt{I^2 + Q^2}$, as will be seen in FIG. 4. As will be appreciated and as will be seen in FIG. 5, $\sqrt{I^2 + Q^2}$ indicates the magnitude of a diagonal which extends through a distance R and terminates at a position corresponding to a horizontal distance represented by the magnitude I and through a vertical distance represented by the magnitude Q. The stage 166 accordingly determines the combined level of the intensities of the luminance and the chrominance at each instant.

The multiplier stage 170 limits the amplitude of the signals from the stage 168 at each instant by a factor dependent upon the amplitude of the signals from the stage 166 at that instant. This limiting factor prevents the amplitude of the video signals at 502 from ever having an amplitude above or below the legal or problematic level. In this way, a progressive range of color intensities is generated even when the color signals have levels above or below the legal or problematic level. The signals from the stage 170 are introduced to a multiplier stage 172 which receives the cosine signals on a line 174 from the read-only memory 60 in FIGS. 2 and 3.

The multiplier stage 182 limits the amplitude of the signals from the stage 180 at each instant by a factor dependent upon the amplitude of the signals from the stage 166 at that instant. This limiting factor operates to limit the amplitude of the signals from the low pass filter 180 in the same manner as the limiting of the amplitude of the signals from the low pass filter 168. This assures that a progressive range of color intensities is generated even when the color signals have levels above or below the legal or problematic level.

The signals from the multiplier stage 182 are introduced to a multiplier stage 184 which receives the sine signals on a line 186 from the read-only memory 58 in FIGS. 2 and 3. The signals from the stages 184 and 172 are then combined in an adder 188. The signals from the adder 188 are in turn combined in an adder stage 190 with the luminance signals on the line 160.

The apparatus described above has certain important advantages. It provides for a generic generation of signals at the proper color sub-carrier frequency whether the system is operating in the NTSC or PAL formats and whether the system is operating in the square pixel, studio or digital modes. It also provides for the generation of a full range of color intensities even when the levels of the color signals are above or below the legal or problematic level.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

What is claimed is:

1. In combination for operating upon signals at a pixel clock frequency to obtain the production of signals at a television sub-carrier frequency,
   a first register for providing a count and for producing an overflow upon each occurrence of an accumulation of a first particular count in the first register,
   means for introducing signals at the pixel clock frequency to the first register,
   a second register for providing a second particular count,
   an adder,
   means for introducing to the adder the second particular count in the second register and a count remaining in the first register after each overflow of the first register,
   means for introducing the count in the adder to the first register upon each introduction of a signal at the pixel clock frequency to the first register to obtain an accumulation of such count in the first register,
   means for using the overflow from the first register as the signals at the television sub-carrier frequency,
   means for providing television signals representing at each instant the primary colors red, green and blue, means for converting the primary color signals at each instant into luminance and chrominance signals at such instant, means for operating upon the luminance and chrominance signals to produce signals representing a particular factor, and means for varying the amplitude of the chrominance signals in accordance with the signals representing the particular factor.

2. In combination for operating upon signals at a pixel clock frequency in each of the NTSC and PAL formats to obtain the production of signals at a television sub-carrier frequency, a plurality of registers connected in a sequential arrangement, each of the registers being constructed to count incoming signals and to provide an output signal upon the occurrence of a count individual to such register, means for introducing the pixel clock signals to a first one of the registers in the sequence upon the occurrence of the pixel clock frequency in the PAL format and for introducing the pixel clock signals to a second one of the registers in the sequence upon the occurrence of the pixel clock frequency in the NTSC format, means for introducing the output signal from each of the registers in the sequence to the next register in the sequence, means for introducing to each of the registers a modulus dependent upon the particular conversion to be made from the pixel clock frequency to the sub-carrier frequency to control a frequency at which the output signal is produced from such register, and means for obtaining the signals at the sub-carrier frequency from the last register in the sequence.

3. In a combination as set forth in claim 2, an adder associated with each register, means for introducing to each adder a modulus controlling the count in the register in accordance with the introduction of an input signal to such register and for providing for the introduction to that adder of any remainder in the register upon each production of an output signal in the register, means for adding the count in the adder to the count in the associated register upon each introduction of an input signal to such register.

4. In a combination as set forth in claim 2, the second register being later in the sequence than the first register, and the modulus for each of the registers being adjustable in accordance with the occurrence of the pixel clock signals in a square pixel mode, a digital video mode and a studio mode in the PAL format and the occurrence of the pixel clock signals in the square pixel mode, the digital video mode and the studio mode in the NTSC format.

5. In a combination as set forth in claim 2, means for providing at each instant signals representing the primary colors red, green and blue at that instant, means for converting the primary color signals at each instant to luminance and chrominance signals, and means for processing the luminance and chrominance signals at each instant to adjust the chrominance signals to a level within particular limits.

6. In combination for providing color television signals, first means for providing television signals representing at each instant the primary colors red, green and blue, second means for converting the primary color signals at each instant into luminance and chrominance signals, third means for operating upon the luminance and chrominance signals to produce a signal representing a particular factor, and fourth means for varying the intensity of the chrominance signals in accordance with the signal representing the particular factor to maintain the color intensity within particular limits.

7. In a combination as set forth in claim 6, the chrominance signals comprising two (2) signals each representing a component of chrominance transverse to the component represented by the other signal, the fourth means including fifth and sixth means for respectively varying the intensities of the individual components of the chrominance signals in accordance with the particular factor to maintain the color intensity within the particular limits.

8. In a combination as set forth in claim 7, each of the fifth and sixth means including a multiplier for receiving an individual one of the two (2) signals representing the components of chrominance and the signal representing the particular factor to vary the intensity of such individual one of the chrominance signals by the particular factor to maintain the color intensity within the particular limits.

9. In a combination as set forth in claim 8, the color television signals being presentable in a plurality of different formats, the color television signals in each format being presentable in a plurality of different modes, the color television signals having an individual pixel clock frequency dependent upon the individual one of the different formats in which the color television signals are being presented and dependent upon the mode of operation in such individual format, means for producing, from the signals at the individual pixel clock frequency, signals having a particular sub-carrier frequency.

10. In a combination for providing color television signals, first means for providing at each instant signals representing at each instant the primary colors red, green and blue, second means for converting the primary color signals into signals representing at each instant the luminance and chrominance of the primary colors, third means for providing at each instant signals representing a particular combination of the luminance and chrominance signals, and fourth means for varying at each instant the amplitudes of the chrominance signals in accordance with the characteristics of the signals from the third means to maintain the amplitudes of the chrominance signals within particular limits.

11. In a combination as set forth in claim 10, there being two (2) chrominance signals each representing a component of chrominance transverse to the component of chrominance represented by the other chrominance signal, the third means being operative to provide at each instant signals representing the sum of the amplitude of the luminance signals and the square root of the sum of the squares of the amplitudes of the chrominance signals.

12. In combination as set forth in claim 11, a pair of multipliers each receiving an individual one of the chrominance signals, and means for introducing the signals from the third means to each of the multipliers to vary the amplitudes of the chrominance signals introduced to such multipliers in accordance with the characteristics of the signals from the third means to maintain the amplitudes of the chrominance signals from such multipliers within the particular limits.

13. In a combination as set forth in claim 1, a first read-only memory, means for introducing the non-overflow signals from the first register to the first read-only memory to obtain signals representing a sine of such signals, a second read-only memory, and means for introducing the non-overflow signals from the first register to the second read-only memory to obtain signals representing a cosine of such signals.

14. In combination for operating upon television signals at a pixel clock frequency to obtain the production of signals at a television sub-carrier frequency, a first register for providing a count and for producing an overflow upon each occurrence of an accumulation of a first particular count in the first register, means for introducing signals at the pixel clock frequency to the first register, a second register for providing a second particular count, an adder, means for introducing to the adder the second particular count in the second register and a count remaining in the first register after each overflow of the first register, means for introducing the count in the adder to the first register upon each introduction of a signal at the pixel clock frequency to the first register to obtain an accumulation of such count in the first register, means for using the overflow from the first register as the signals at the television sub-carrier frequency, means for providing luminance and chrominance signals to represent the television signals, means for operating upon the luminance and chrominance signals to produce signals representing a particular control factor, and means for varying the amplitude of the chrominance signals in accordance with the signals representing the particular control factor.

15. In combination for operating upon television signals at a pixel clock frequency to obtain the production of signals at a television sub-carrier frequency, first means for providing signals at the pixel clock frequency, second means for providing a first factor for counting the signals at the pixel clock frequency, third means for outputting the signals, factored by the first factor, at the pixel clock frequency and for producing a signal upon each occurrence of a particular value in a count, fourth means for using the signals in the third means as the sub-carrier frequency, fifth means for introducing the remainder of the count in the third means to the third means, upon each occurrence of the particular value in the count in the third means, in accordance with the production of the signals at the pixel clock frequency, means for providing luminance and chrominance signals to represent the television signals, means for operating upon the luminance and chrominance signals to produce signals representing a particular control factor, and means for varying the amplitude of the chrominance signals in accordance with the signals representing the particular control factor.

16. In a combination as set forth in claim 14, the varying means being operative to limit the amplitude of the chrominance signals to a progressive range approaching a saturation level.

17. In a combination as set forth in claim 15, the varying means being operative to limit the amplitude of the chrominance signals to a progressive range approaching a saturation level.

18. In combination for providing color television signals representing a video image, first means for providing color television signals representing luminance and chrominance of the video image, second means for operating upon the color television signals representing luminance and chrominance to produce a signal representing a particular control factor, and third means for varying the intensity of the television signals representing chrominance in accordance with the signal representing the particular control factor to maintain the color intensity of the video image within particular limits.

19. In a combination as set forth in claim 18, the television signals representing the chrominance comprising two (2) signals each representing a component of chrominance in a quadrature relationship to the component representing by the other signal, and the third means including fourth and fifth means for respectively varying the intensities of the individual components of the chrominance signals in accordance with the signal representing the particular control factor to maintain the color intensity within the particular limits.

20. In a combination as recited in claim 19, each of the fourth and fifth means including a multiplier for receiving an individual one of the two (2) signals representing the components of chrominance and the signal representing the particular control factor to vary the intensity of such individual one of the chrominance signals by the particular control factor to maintain the color intensity within the particular limits.

21. In a combination as set forth in claim 20, the color television signals being presentable in a plurality of different formats, the color television signals in each format being presentable in a plurality of different modes, the color television signals having an individual pixel clock frequency dependent upon the individual one of the different formats in which the color television signals are being presented and dependent upon the mode of operation in such individual format, and means for producing, from the signals at the individual pixel clock frequency, signals having a particular sub-carrier frequency.

22. In combination for providing color television signals representing a video image, first means for providing signals representing the luminance and chrominance of the video image, second means responsive to the signals representing the luminance and chrominance of the video image for providing at each instant control signals representing a particular combination of the luminance and the chrominance of the video image, and third means for varying at each instant the amplitudes of the chrominance signals in accordance with the characteristics of the control signals to maintain the amplitudes of the chrominance signals within particular limits.

23. In a combination as set forth in claim 22, there being two (2) chrominance signals each representing a component of chrominance in quadrature relationship to the component of the chrominance represented by the other chrominance signal, the second means being operative to provide at each instant signals representing the sum of the amplitude of the luminance signals and the amplitude represented by the square root of the sum of the squares of the amplitudes of the chrominance signals.

24. In a combination as set forth in claim 23, a pair of multipliers each receiving an individual one of the chrominance signals, and means for introducing the signals from the second means to each of the multipliers to vary the amplitudes of the chrominance signals introduced to such multipliers in accordance with the characteristics of the signals from the second means to maintain the amplitudes of the chrominance signals within the particular limits.

25. In combination for operating upon television signals at a pixel clock frequency in each of NTSC and PAL formats to obtain the production of signals at a television sub-carrier frequency, a first plurality of registers disposed in a sequential arrangement, each of the registers having an input and an output and having an individual modulus, means for connecting the output of each of the registers in the first plurality to the input of the next one of the registers in the first plurality, a plurality of adders each associated with an individual one of the registers in the first plurality, means for introducing the signals at the pixel clock frequency in the PAL format to each of the registers in the first plurality and for introducing the signals at the pixel clock frequency in the NTSC format to the registers in the first plurality other than a first one of the registers in the first plurality, and a second plurality of registers each connected to an individual one of the adders in the plurality.

26. In a combination as set forth in claim 25, means for introducing to each of the adders in the plurality the output from the associated register in the second plurality and for providing the introduction to that adder of any remainder in the associated one of the registers in the first plurality upon each production of an output signal in such associated one of the registers in the first plurality, and means for adding in each adder the output from the associated one of the registers in the second plurality and any remainder in the associated one of the registers in the first plurality upon each production of an output signal in such associated one of the registers in the first plurality when the signals at the pixel clock frequency are introduced to the associated one of the registers in the first plurality.

27. In a combination as set forth in claim 26, the television signals in each of the PAL format and the NTSC format having an individual one of a square pixel mode, a digital video mode and a studio mode, the pixel clock signals having individual frequencies dependent upon the occurrence of the television signals in the individual one of the PAL format and the NTSC format and dependent upon the individual one of the square pixel mode, the digital video mode and the studio mode, the modulus for each of the registers in the first plurality being adjustable in accordance with the occurrence of the pixel clock signals in the square pixel mode, the digital video mode and the studio mode in the PAL format and the occurrence of the pixel clock signals in the square pixel mode, the digital video mode and the studio mode in the NTSC format.

28. In combination for operating upon television signals at a pixel clock frequency in a PAL format to obtain the production of signals at a television sub-carrier frequency, a plurality of registers connected in a sequential arrangement, each of the registers having an individual modulus to provide overflow signals in accordance with such individual modulus, means for introducing the signals at the pixel clock frequency to each of the registers in the plurality, a plurality of adders each responsive to the overflow signals from an individual one of the registers in the plurality to add such overflow signals in such adder, means for introducing the overflow signals from each of the registers in the plurality of an individual one of the adders in the plurality, and a plurality of means each associated with an individual one of the adders in the plurality for introducing an individual value to the individual adder upon each occurrence of the signals at the pixel clock frequency for combination with the overflow signals from the associated register in the plurality.

29. In a combination as set forth in claim 28, means for providing an output at the sub-carrier frequency from the last one of the registers in the plurality in the sequential arrangement.

30. In a combination as set forth in claim 28, the television signals in the PAL format having an individual one of a square pixel mode, a digital video mode and a studio mode, the television signals having an individual pixel clock frequency dependent upon the occurrence of the television signals in the individual one of the square pixel mode, the digital video mode and the studio mode, each of the registers in the plurality having an individual modulus dependent upon the pixel clock frequency of the signals in the square pixel mode, the digital video mode and the studio mode.

31. In a combination as set forth in claim 30,
each of the introducing means in the plurality having the individual value dependent upon the pixel clock frequency in the individual one of the square pixel mode, the digital video mode and the studio mode.

32. In a combination as set forth in claim 30,
the registers being in a first plurality,
the introducing means in the plurality constituting a second plurality of registers,
each of the registers in the first plurality having an individual modulus dependent upon the occurrence of the television signals in the individual one of the square pixel mode, the digital video mode and the studio mode.

* * * * *